United States Patent
Knott et al.

(10) Patent No.: US 7,825,209 B2
(45) Date of Patent: Nov. 2, 2010

(54) PROCESS FOR THE PREPARATION OF SIOC-LINKED, LINEAR POLYDIMETHYLSILOXANE-POLYOXY ALKYLENE BLOCK COPOLYMERS AND THEIR USE

(75) Inventors: Wilfried Knott, Essen (DE); Klaus-Dieter Klein, Muelheim (DE); Rüdiger Landers, Essen (DE); Dagmar Windbiel, Essen (DE)

(73) Assignee: Evonik Goldschmidt GmbH (DE)

( * ) Notice: Subject to any disclaimer, the term of this patent is extended or adjusted under 35 U.S.C. 154(b) by 348 days.

(21) Appl. No.: 11/956,483

(22) Filed: Dec. 14, 2007

(65) Prior Publication Data

US 2008/0153995 A1 Jun. 26, 2008

(30) Foreign Application Priority Data

Dec. 22, 2006 (DE) .................. 10 2006 061 351

(51) Int. Cl.
*C08G 77/04* (2006.01)
*C08G 77/06* (2006.01)
*C08G 77/08* (2006.01)

(52) U.S. Cl. .......................... 528/29; 528/31

(58) Field of Classification Search .............. 528/29
See application file for complete search history.

(56) References Cited

U.S. PATENT DOCUMENTS

| | | | | | |
|---|---|---|---|---|---|
| 3,280,160 | A | * | 10/1966 | Bailey | 556/444 |
| 3,629,308 | A | * | 12/1971 | Bailey et al. | 556/445 |
| 3,836,560 | A | * | 9/1974 | Prokai et al. | 556/446 |
| 3,846,462 | A | * | 11/1974 | Prokai et al. | 556/416 |
| 3,867,420 | A | * | 2/1975 | Morehouse et al. | 556/420 |
| 3,887,500 | A | * | 6/1975 | Prokai et al. | 521/111 |
| 3,887,601 | A | * | 6/1975 | Kanner et al. | 556/420 |
| 3,980,688 | A | * | 9/1976 | Litteral et al. | 556/446 |
| 4,269,992 | A | * | 5/1981 | Litteral et al. | 556/446 |
| 4,814,409 | A | * | 3/1989 | Blevins et al. | 528/25 |
| 5,432,206 | A | * | 7/1995 | Stanga et al. | 521/110 |
| 6,187,891 | B1 | * | 2/2001 | Rautschek et al. | 528/25 |
| 2007/0049717 | A1 | * | 3/2007 | Knott et al. | 528/29 |

* cited by examiner

*Primary Examiner*—Randy Gulakowski
*Assistant Examiner*—Robert Loewe
(74) *Attorney, Agent, or Firm*—Frommer Lawrence & Haug LLP

(57) ABSTRACT

The invention relates to a process for the preparation of SiOC-linked, linear polydimethylsiloxane-polyoxyalkylene block copolymers having (AB) repeat units, via reaction of one or more polyetherdiols with a stoichiometric excess of $\alpha,\omega$-dihydropolydimethylsiloxanes and at least one tertiary amine as catalyst, which comprises, after completed reaction of the alcohol component, continuing the reaction in the presence of small amounts of water until no remaining $\equiv$Si(H) groups are detectable by a gas-volumetric method.

11 Claims, No Drawings

PROCESS FOR THE PREPARATION OF SIOC-LINKED, LINEAR POLYDIMETHYLSILOXANE-POLYOXY ALKYLENE BLOCK COPOLYMERS AND THEIR USE

This application claims benefit under 35 U.S.C. 119 (a) of German patent application DE 10 2006 061351.1, filed on 22 Dec. 2006.

Any foregoing applications, including German patent application DE 10 2006 061351.1, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

Citation or identification of any document in this application is not an admission that such document is available as prior art to the present invention.

The invention relates to a process for the preparation of SiOC-linked, linear polydimethylsiloxane-polyoxyalkylene block copolymers having (AB) repeat units which comprise an average of $\geq 1$ siloxane groups at their ends.

When flexible polyurethane foams are produced, polysiloxane-polyoxyalkylene block copolymers are added to the mixture of the raw materials and have a variety of functions, inter alia permitting formation of a uniform pore structure and stabilizing the resultant foam until the reaction is complete. However, not all polysiloxane-polyoxyalkylene block copolymers are equally suitable. To be useful as polyurethane foam stabilizers, the polyoxyalkylene blocks and the polysiloxane block of the block copolymers have to be present in a balanced ratio, and the structure of the two blocks is also of great importance here. A wide variety of variables is available here both for the polyoxyalkylene block and for the polysiloxane block, in creating a foam stabilizer of maximum effectiveness:

The polyoxyalkylene block can be composed of various oxyalkylene units, mainly oxyethylene units, oxypropylene units, and oxybutylene units. The ratio by weight of these units to one another can be varied here, as can their sequence, and also the molecular weight of the polyoxyalkylene block. Another important factor is the end group of the polyoxyalkylene block, which can be reactive (e.g. OH group) or inert (e.g. alkoxy group) with respect to polyurethane formation. The polyoxyalkylene block can have linkage to the polysiloxane block via a hydrolytically stable C—Si bond or via a C—O—Si bond, which has lower hydrolytic stability. There can also be various polyoxyalkylene blocks bonded to the polysiloxane block here.

The polysiloxane block can be varied with respect to the type and proportion of the Si units. The siloxane block can be straight-chain or branched and can have varying molecular weight. The manner of bonding of the polyoxyalkylene blocks to the polysiloxane block can be terminal and/or pendent.

There is only limited possibility of prediction of effectiveness of a polysiloxane-polyoxyalkylene block copolymer as foam stabilizer. The person skilled in the art is therefore substantially forced to use empirical methods to test possible variations. In view of the large, almost infinite, number of possible variations, the discovery of particularly effective specific structural parameters and appropriate block copolymers for the purposes of polyurethane production is an activity which represents considerable technical progress and is therefore inventive.

There have been many previous descriptions of polysiloxane-polyoxyalkylene block copolymers having various polyoxyalkylene radicals in the average molecule. The following specifications are mentioned as representatives of the large number of appropriate publications:

DE 10 2005 039 931.2 (US Patent Application Publication 2007-049717) describes a process for the preparation of SiOC-linked, linear polydimethylsiloxane-polyoxyalkylene block copolymers having (AB) repeat units. In said process, a small amount of a tertiary amine, e.g. from the group of the aromatic amines (pyridines, pyrimidines, pyridazine, pyrazine, quinoline, imidazole, etc.) and/or from the group of the cycloaliphatic amine bases (quinuclidine, diazabicyclo [2.2.2]octane, etc.), and here in particular 1,8-diazabicyclo [5.4.0]undec-7-ene, is added at elevated temperatures to a reaction matrix composed of aminosiloxane, polyoxyalkylenediol, and solvent, and the polycondensation reaction is carried out by the general reaction $\equiv$SiNH$_2$+ HOC$\equiv$$\rightarrow$SiOC$\equiv$+NH$_3$ with liberation of ammonia until the desired molecular-weight increase has been achieved.

In U.S. Pat. No. 3,836,560 there is a previous description of these compounds, their use for the production of polyurethane foams, and also a process for their preparation. The content of said references is hereby incorporated by way of reference, and forms part of the disclosure of the present application.

Said polyether siloxanes are valuable surfactant additives for the production of polyurethane foams, and in particular here their cell-opening action in ether foams or open-cell rigid foams is desirable. A disadvantage in their industrial synthesis is that both the preparation of the amine component, with its problem of salt production, and the coupling process itself are complicated, and some of the compounds used in these operations are problematic and difficult to handle under factory conditions.

It was therefore an object of the present invention to develop a simple, cost-effective process which can prepare (AB) block copolymers with improved properties.

Surprisingly, a difference from the available prior art has now been found in that access to novel high-molecular-weight linear SiOC-linked polydimethylsiloxane-polyoxyalkylene block copolymers becomes available if polyetherdiols are reacted with a stoichiometric excess of α,ω-dihydropolydimethyl-siloxanes, in the presence of at least one tertiary amine as catalyst and small amounts of water.

This method gives, in a manner not foreseeable by the person skilled in the art, structures which when used as stabilizers in the production of polyurethane foams (PU foams), in particular flexible PU foams, have a distinctly higher level of properties.

The invention therefore provides a process for the preparation of SiOC-linked, linear polydimethylsiloxane-polyoxyalkylene block copolymers having (AB) repeat units, via reaction by methods known per se of polyetherdiols with a stoichiometric excess of α,ω-dihydropolydimethylsiloxanes and one or more tertiary amines as catalyst, which comprises, after completed reaction of the alcohol component, continuing the reaction in the presence of small amounts of water until no remaining $\equiv$Si(H) groups are detectable by a gas-volumetric method.

The invention further provides for the use, as tertiary amine, of at least one compound selected from the group consisting of the aromatic amines (pyridines, pyrimidines, pyridazine, pyrazine, quinoline, imidazole, etc.) and/or from the group of the cycloaliphatic amine bases (quinuclidine, diazabicyclo[2.2.2]octane, etc.), 1,8-diazabicyclo[5.4.0]undec-7-ene and pyrimidine.

The invention further provides SiOC-linked, linear polydimethylsiloxane-polyoxyalkylene block copolymers prepared by this process.

The invention further provides the use of the compounds prepared by the inventive process as surfactant additives for production of polyurethane ether foams.

Further subject matters of the invention are characterized by the claims.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right and hereby disclose a disclaimer of any previously described product, method of making the product or process of using the product.

The siloxane blocks A of the copolymers mainly represent linear siloxane polymers or chains having siloxane repeat units which can be represented by the molecular formula $(-R_2SiO-)_b$.

The polyoxyalkylene block (B) of the linear block copolymers is an oxyalkylene polymer containing $(-C_nH_{(2n-m)}R^1_mO-)_c$ oxyalkylene repeat units.

The average molar mass of each siloxane block (A) is selected from the ranges consisting of from about 650 to about 6500 g/mol, from about 800 to about 1500 g/mol, and from about 1000 to about 1200 g/mol.

The number-average molar mass (Mn) of each polyoxyalkylene block of the copolymers prepared in the invention is selected from the ranges consisting of from about 600 to about 10 000 g/mol and from about 1000 to about 5000 g/mol.

The size of the individual oxyalkylene units or siloxane blocks is not necessarily uniform, but can vary as desired within the stated limits.

The individual polyoxyalkylene units are adducts composed of at least one oxyalkylene monomer, selected from the group consisting of ethylene oxide, propylene oxide, butylene oxide, and mixtures thereof. In one embodiment of the invention, the adducts are mixed products composed of at least two monomer units, e.g., ethylene oxide and propylene oxide.

The polyoxyalkylene blocks are in essence composed of oxyethylene units or oxypropylene units, e.g., mixed oxyethylene units and oxypropylene units with oxyethylene content of about 30 to about 70% by weight and oxypropylene content of from about 70 to about 30% by weight, based on the total content of oxyalkylene units in the block.

The total content of siloxane block in the copolymer is is selected from the group consisting of from about 20 to about 50% by weight, from 25 to about 40% by weight, and the content of the polyoxyalkylene blocks is from about 80 to about 50% by weight, and the number-average molar mass Mn of the block copolymer is selected from the group consisting of from at least about 20 000 g/mol to about 160 000 g/mol, from about 25 000 g/mol to about 100 000 g/mol, from about 30 000 g/mol to about 60 000 g/mol, and from about 35 000 g/mol to about 50 000 g/mol. The average molar masses here are determined by a method based on the known methods of GPC analysis.

For the purposes of the present invention, effective catalysts are one or more tertiary amines selected from the group of the aromatic amines (pyridines, pyrimidines, pyridazine, pyrazine, quinoline, imidazole, etc.) and/or from the group of the cycloaliphatic amine bases (quinuclidine, diazabicyclo [2.2.2]octane, etc.), and here in particular 1,8-diazabicyclo [5.4.0]undec-7-ene. A preferred catalyst combination in the invention is composed of 1,8-diazabicyclo[5.4.0]undec-7-ene (DBU) and pyrimidine. These compounds can be used in the form of a combination from the start, or, for example, the reaction can be carried out with DBU as far as complete conversion of the OH groups and then continued with water and the pyrimidine as far as complete conversion of the SiH groups.

Amounts usually used of the catalysts/catalyst combinations selected from the group consisting of from about 0.01 to about 3.0 by weight, and from about 0.10 to about 2.30% by weight, based on the initial charge of hydrosiloxane and polyether.

The molar ratio of α,ω-hydrosiloxanes to polyetherdiols is in the range from about 1.00 to about 2.00, from about 1.25 to about 1.65, and from about 1.35 to about 1.55.

In one embodiment of the invention, the amount of water used concomitantly is the half-equivalent of the α,ω-dihydropolydimethylsiloxane excess used for formation of the copolymer claimed in the invention. Amounts differing from this can be used, but do not provide any advantage in relation to the desired final products, since either free Si—H groups or free water remain in the reaction mixture.

The inventive process is generally carried out via reaction of polyorganosiloxanes which contain —Si(H) units and which have the general formula (II)

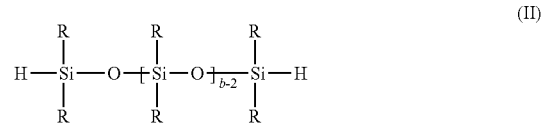

(II)

where:

R, independently of one another, are monovalent $C_1$-$C_{18}$ hydrocarbon radicals, preferably alkyl, alkene, alkyne, cycloalkyl or aryl radicals, which includes but is not limited to $C_1$-$C_4$ hydrocarbon radicals, preferably alkyl radicals and methyl radicals, and b is selected from the range of from 8 to 80, from 10 to 50, and from 10 to 25, with at least one alcohol selected from the group of the polyetherdiols with the general formula (III)

(III)

where $R^1$, independently of one another, are $C_1$-$C_4$-alkyl radicals, (in one embodiment of the invention, $R^1$ is methyl radicals and ethyl radicals), n is from 2 to 4,
m is 0 or 1, and
x has a value selected from the group consisting of from 1 to 200, from 10 to 100, and from 35 to 60,
where
the oxyalkylene segments —$(C_nH_{(2n-m)}R^1{}_mO—)$ can differ from one another within an oxyalkylene ether radical, and the sequence of the individual —$(C_nH_{(2n-m)}R^1{}_mO—)$ segments can also be as desired, and this in particular encompasses block copolymers, random polymers, and also combinations of these.

Polyetherdiols used in the invention include but are not limited to those in which ethylene oxide (EO) and propylene oxide (PO) are present in the form of copolymers. One embodiment of the polyetherdiols are EO/PO copolymers which have a block structure and which have EO content of about 30 to about 70% by weight, based on the total content of oxyalkylene units.

The analytical values for the compounds prepared in the inventive process do not contradict the assumption that a difference from the prior art is achieved in obtaining access to high-molecular-weight linear SiOC-linked polydimethylsiloxane-polyoxyalkylene block copolymers having (AB) repeat units which have high-siloxane-content domains (X, Y) within their ends.

This method gives, in a manner not foreseeable by the person skilled in the art, X-$(AB)_d$—Y structures which have high-siloxane-content domains (X, Y) within their ends.

The invention therefore further provides SiOC-linked, linear $(AB)_d$ polydimethylsiloxane-polyoxyalkylene block copolymers of the general formula (I)

$$HO(R_2SiO)_a[(R_2SiO)_b(C_nH_{(2n-m)}R^1{}_mO)_c]_d(R_2SiO)_eH \qquad (I)$$

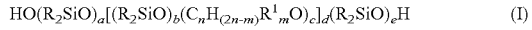

in which the substituents and indices are defined as follows
R, independently of one another, monovalent $C_1$-$C_{18}$, which includes but is not limited to $C_1$-$C_4$ hydrocarbon radicals and methyl radicals,
$R^1$, independently of one another, methyl radicals and ethyl radicals,
a and e, are independently of one another, selected from the group consisting of on average $\geq 1$, preferably $\geq 5$, and more preferably of from $\geq 7$ to $\leq 49$, with the proviso that the sum (a+e)>1 preferably with the proviso that the sum (a+e)$\leq$50,
b is selected from the ranges of from 8 to 80, from 10 to 50, and from 10 to 25,
c is $\geq 10$, preferably $\geq 20$, and more preferably of from $\geq 40$ to $\leq 150$,
d is selected from the group consisting of $\geq 3$ and $\leq 10$, and $\geq 5$ and $\leq 8$,
m 0 or 1,
n a number is selected from the group consisting of from 2 to 4, and 2 or 3.

The average molar mass of the siloxane blocks X(—$R_2SiO$—)a and Y(—$R_2SiO$—)e, where R=—$CH_3$, is selected from the group consisting of from 74 to 518 g/mol, from 148 to about 3000 g/mol, from 300 to about 2000 g/mol, and from 500 to about 1200 g/mol.

One particularly sensitive and powerful method of evaluating the presence of dimethylsiloxane blocks within the ends of the inventive compounds is provided by the performance test in which the resultant copolymer is introduced in the form of foam stabilizer into polyurethane formulations for the production of, in particular, ether foams, or open-cell rigid foams.

Inadequate content of siloxane blocks (X, Y) in the foam stabilizer is discernible as inadequate technical performance in the foaming process, examples being shrinkage or collapse.

The invention is further described by the following non-limiting examples which further illustrate the invention, and are not intended, nor should they be interpreted to, limit the scope of the invention.

PREPARATION EXAMPLES

The SiOC-linked, linear polydimethylsiloxane-polyoxyalkylene block copolymers claimed in the inventive process can optionally be prepared with or without use of a suitable solvent.

If high-molecular-weight SiOC-linked copolymers are desired, with attendant high viscosity, they can advantageously be prepared, with a view to their easy handling during and after synthesis, via the reaction of the respective polyetherdiol with the respective α,ω-hydrosiloxane in a suitable solvent.

Suitable solvents are alkanes, cycloalkanes, alkylaromatics, and the like, and particular preference is given here to high-boiling solvents whose boiling points are >120° C.

The reactants, composed of at least one polyetherdiol and of one or more α,ω-hydrosiloxanes, possibly with involvement of a solvent, can in principle together form an initial charge with intimate mixing at elevated temperature, and be reacted via addition of a sufficient amount of an inventive catalyst, or else can be introduced sequentially into the reaction.

In one embodiment of the process, the polyetherdiol or the polyetherdiol mixture is treated in a high-boiling solvent at elevated temperature first with a small amount of the concomitantly used inventive catalyst and then, with good mixing, by a feed-controlled method, with the α,ω-hydrosiloxane or with a mixture composed of one or more α,ω-hydrosiloxanes.

Excellent monitoring and control is possible when using this method to prepare the copolymers claimed in the invention, with liberation of gas. The individual components can also be added sequentially in order to control the structure of the final product.

The molar ratio of α,ω-hydrosiloxanes to polyetherdiols is in the range selected from the group consisting of from about 1.00 to about 3.00, from about 1.0 to about 2.5, and from about 1.25 to about 1.70.

The amounts usually used of the catalysts are selected from the group consisting of from about 0.01 to about 3.0, and from about 0.10 to about 2.30% by weight, based on the initial charge of hydrosiloxane and polyether.

The reaction temperature for preparation of the inventive copolymers should be elected from the group consisting of from about 110° C. to about 160° C., and from about 120° C. to about 145° C.

Premature introduction of water into the reaction mixture, for example via water-containing starting materials or atmospheric moisture, is to be substantially avoided in the inventive process. It has been found that although a reaction takes place, rising water content has an adverse effect on the desired favorable properties of the reaction products as additives in the production of polyurethane foams.

Example 1

Comparative Example 55.0 g of a polyoxyalkylenediol with average molar mass of 2800 g/mol and ethylene oxide/propylene oxide ratio of about 1:1 are used as initial charge together with 77.5 g of a linear alkylbenzene with boiling range of about 280 to 320° C., and 22.5 g of an α,ω-hydrosiloxane (average chain length N=15) in a stoichiometric ratio (OH group:≡SiH group=1: 1), based on the polyether used, in a 500 ml four-necked flask equipped with stirrer, internal thermometer, and reflux condenser with flexible gas-outlet tube. 0.1 g of 1,8-diazabicyclo [5.4.0]undec-7-ene are then added to the mixture. SiH conversion determined by a gas-volumetric method is quantitative after 4 h at 135° C.

Example 2

55.0 g of a polyoxyalkylenediol with average molar mass of 2800 g/mol and ethylene oxide/propylene oxide ratio of about 1:1 are used as initial charge together with 91.0 g of a linear alkylbenzene with boiling range of about 280 to 320° C., and 36.0 g of an α,ω-hydrosiloxane (average chain length N=15) in a 60% excess, based on the polyether used, in a 500 ml four-necked flask equipped with stirrer, with precision glass gland, internal thermometer, and reflux condenser with flexible gas-outlet tube. 0.1 g of 1,8-diazabicyclo[5.4.0]undec-7-ene are then added to the mixture. SiH conversion determined by a gas-volumetric method is 63% after 8.5 h at 135° C. Addition of 0.06% of $H_2O$, based on the entire mixture, completes the reaction.

Example 3

55.0 g of a polyoxyalkylenediol with average molar mass of 2800 g/mol and ethylene oxide/propylene oxide ratio of about 1:1 are used as initial charge together with 88.2 g of a linear alkylbenzene with boiling range of about 280 to 320° C., and 33.2 g of an α,ω-hydrosiloxane (average chain length N=15), in a 50% excess, based on the polyether used, in a 500 ml four-necked flask equipped with stirrer, with precision glass gland, internal thermometer, and reflux condenser with flexible gas-outlet tube. 0.67 g of 1,8-diazabicyclo[5.4.0]undec-7-ene are then added to the mixture. SiH conversion determined by a gas-volumetric method is 84% after 3 h at 135° C. Addition of 0.34 g of pyrimidine and 0.03% of $H_2O$, based on the entire mixture, completes the reaction within 90 min.

Polydimethylsiloxane-polyoxyalkylene block copolymer obtained by inventive processes tested as foam stabilizer:

The performance test uses the typical formulation, constituted as follows, for an ether foam:

| Parts by weight | Constituents of mixing specification |
|---|---|
| 0.07 | Kosmos ® 29 (stannous 2-ethylhexanoate) from Goldschmidt GmbH |
| 30 | Polyol CP 3322 (commercially available polyol) from DOW |
| 70 | Polyol CP 755 (commercially available polyol) from DOW |
| 7 | Polyol CP 1421 (commercially available polyol) from DOW |
| 1.95 | Water |
| 0.2 | Tegoamin ® BDE (bis(dimethylaminoethyl) ether solution) from Goldschmidt GmbH |
| 0.3 | Tegoamin ® 33 (triethylenediamine solution) |
| 0.2 | Tegoamin ® DMEA (dimethylethanolamine solution) |
| 1.2 | of foam stabilizer to be tested |
| 40.3 | tolylene diisocyanate (TDI 80) (corresponding to an index of 85). |

Testing of Foam Stabilizers:

The tin catalyst stannous 2-ethylhexanoate, the three polyols, the water, and the three amine catalysts are used as initial charge in a paper cup and mixed for 60 s at 1000 rpm, using a disk stirrer. The isocyanate is then added and incorporated for 7 s at 1500 rpm, using the same stirrer. The mixture in the cup begins to foam here. It is therefore poured into a foaming box directly after stirring has ended. This has a basal area of 17×17 cm and a height of 30 cm. External PU foam insulation of thickness 5 cm prevents excessively rapid cooling. The box has been designed with an internal plastics foil to permit subsequent removal of the fully cured foam. Foam rises once the material has been poured into the foaming box. Ideally, gas pressure in the foam reduces once the maximum rise height has been reached, and the foam then relaxes slightly. The cell membrane of the foam bubbles opens there, and an open-pore cell structure is obtained in the foam. If stabilization is not sufficiently effective, the PU foam collapses prior to reaching maximum rise height. If stabilization is excessive, rise of the foam is very prolonged, and gas pressure in the foam does not reduce. Because the cell structure is then very closed, contraction in volume of the gas as it cools causes shrinkage of the foam.

Results of Foaming of Reaction Products of the Above Inventive Examples

Findings for Example 1

Comparative Example

The foam rises and its gas pressure does not reduce. Instead of this, rise of the foam is prolonged (>3 min). The foam shrinks markedly during subsequent cooling. The shrinkage prevents any measurement of physical properties.

Findings for Example 2

The foam rises, and gas pressure in the foam reduces after about 2 min, and no alteration occurs in the foam during subsequent cooling. Subsequent measurement gave cell number as 10 cells/cm and porosity as 70 mm (measurement of backpressure, by determining the height of a water column generating an equivalent pressure). This shows that the cell structure is sufficiently fine and open (the term closed foams being used for a water column of 300 mm or more). The foam has the desired ether foam properties. The foam stabilizer of example 2 is suitable for production of this type of foam.

Findings for Example 3

The foam rises, and gas pressure in the foam reduces after about 2 min, and no alteration occurs in the foam during subsequent cooling. Subsequent measurement gave cell number as 10 cells/cm and porosity as 70 mm. This shows that the cell structure is sufficiently fine and open. The foam has the desired ether foam properties. The foam stabilizer of example 3 is suitable for production of this type of foam.

Having thus described in detail various embodiments of the present invention, it is to be understood that the invention defined by the above paragraphs is not to be limited to particular details set forth in the above description as many apparent variations thereof are possible without departing from the spirit or scope of the present invention.

What is claimed is:

1. A process for the preparation of SiOC-linked, linear polydimethylsiloxane-polyoxyalkylene block copolymers having (AB) repeat units, which comprises
reaction of one or more polyetherdiols with a stoichiometric excess of α,ω-dihydropolydimethylsiloxanes and at least one tertiary amine as catalyst, wherein, after completed reaction of the alcohol component, continuing the reaction in the presence of water until no remaining ≡Si(H) groups are detectable by a gas-volumetric method.

2. The process of claim 1, via reaction of polyorganosiloxanes which contain —Si(H) units and which have the general formula (II) where:

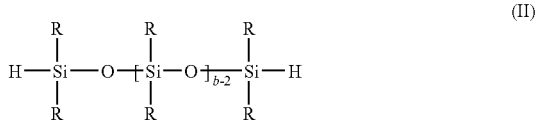

where:
R, independently of one another, is methyl, and
b is from 8 to 80,
with at least one alcohol selected from the group of the polyetherdiols with the general formula (III)

where
$R^1$, independently of one another, are $C_1$-$C_4$-alkyl radicals,
n is from 2 to 4,
m is 0 or 1, and
x has a value from 1 to 200,
where
the oxyalkylene segments —($C_nH_{(2n-m)}R^1_mO$—) can differ from one another within an oxyalkylene ether radical, and the sequence of the individual —($C_nH_{(2n-m)}R^1_mO$—) segments are block copolymers, random polymers, and combinations thereof.

3. The process of claim 1, wherein at least one tertiary amine is used as catalyst.

4. The process of claim 1, wherein the catalyst used comprises at least one tertiary amine selected from the group consisting of the cycloaliphatic amine bases and 1,8-diazabicyclo[5.4.0]undec-7-ene.

5. The process of claim 1, wherein the catalyst used comprises at least one tertiary amine selected from the group consisting of: pyridines, pyrimidines, pyridazine, pyrazine, quinoline, imidazole, quinuclidine, diazabicyclo[2.2.2]octane, and 1,8-diazabicyclo[5.4.0]undec-7-ene.

6. The process of claim 1, wherein the average molar mass of each siloxane block (A) (—$R_2SiO$—)$_b$, where R=$CH_3$—, is from 650 to about 6000 g/mol.

7. The process of claim 1, wherein the polyoxyalkylene block (B) contains mixed oxyethylene units and oxypropylene units (—$C_nH_{(2n-1)}R^1_mO$—)$_c$ with an oxyethylene content of about 30 to about 70% by weight and oxypropylene content of about 70 to about 30% by weight, based on the total content of oxyalkylene units in the block.

8. The process of claim 1, wherein the average molar mass of each polyoxyalkylene block (B) ($C_nH_{(2n-1)}R^1_mO$)$_c$ is from about 600 to about 10 000 g/mol.

9. The process of claim 1, wherein the content of the siloxane blocks in the entire copolymer is from about 20 to about 50% by weight.

10. The process of claim 1, wherein the number average molar mass Mn of the block copolymer is from about 10 000 g/mol to about 1 600 000 g/mol.

11. The process of claim 1, wherein the catalyst used is a cycloaliphatic amine base selected from the group consisting of quinuclidine and diazabicyclo[2.2.2]octane.

* * * * *